United States Patent

Sato et al.

Patent Number: 5,424,829
Date of Patent: Jun. 13, 1995

[54] APPARATUS WHEREIN DIFFRACTED LIGHT DOES NOT RETURN TO THE SOURCE

[75] Inventors: Soichi Sato; Masaki Tomiya; Tatsuo Itabashi, all of Kawasaki, Japan

[73] Assignee: Mitutoyo Corporation, Tokyo, Japan

[21] Appl. No.: 939,209

[22] Filed: Sep. 2, 1992

[51] Int. Cl.$^6$ ................................. G01C 9/02
[52] U.S. Cl. .................. 356/356; 250/237 G
[58] Field of Search .............. 356/355, 356, 363, 400, 356/401; 250/237 G, 231.14

[56] References Cited

U.S. PATENT DOCUMENTS

| | | | |
|---|---|---|---|
| 4,676,645 | 6/1987 | Taniguchi et al. | 356/356 |
| 4,930,895 | 6/1990 | Nishimura et al. | 356/356 |
| 4,979,826 | 12/1990 | Ishizuka | 356/356 |
| 5,000,542 | 3/1991 | Nishimura et al. | |

FOREIGN PATENT DOCUMENTS

| | | | |
|---|---|---|---|
| 0390092 | 10/1990 | European Pat. Off. | |
| 0397202 | 11/1990 | European Pat. Off. | |
| 0486050 | 5/1992 | European Pat. Off. | 356/356 |
| 2227558 | 8/1990 | United Kingdom | |

Primary Examiner—Samuel A. Turner
Attorney, Agent, or Firm—Flynn, Thiel, Boutell & Tanis

[57] ABSTRACT

A lattice interference-type displacement detection device including a scale having a penetration-type diffraction lattice formed on one side thereof, and an optical system positioned adjacent to the diffraction lattice and remote from the scale. The optical system includes a light source which emits a light beam along a light source optical path, a light beam divergence arrangement for branching the light beam into first and second divergence beams along first and second optical paths, respectively, and for causing the first and second divergence beams to be incident at a diffraction point on the diffraction lattice, a light beam mixing arrangement for generating first and second mixing light beams from a first group of diffraction light beams generated at the diffraction point, and an arrangement for converting the first and second mixing light beams into respective electrical signals. The scale also includes a light reflection surface remote from the optical system with respect to the diffraction lattice. The light reflection surface reflects the first group of diffraction light beams generated at the diffraction point to the light beam mixing arrangement along third and fourth optical paths, respectively. The optical system is arranged so that a second group of diffraction light beams generated at the diffraction point are not reflected back along the light source optical path to the light source. The light beam divergence arrangement and light beam mixing arrangement are constructed of a single prism.

7 Claims, 5 Drawing Sheets

APPARATUS WHEREIN DIFFRACTED LIGHT DOES NOT RETURN TO THE SOURCE

BACKGROUND OF THE INVENTION

1. Field of the Invention

This invention is concerned with a lattice interference-type displacement detection equipment and a displacement detection method, and particularly concerned with the lattice interference-type displacement detection equipment which makes a beam of light from a light source branch into two light waves, makes them incident at the identical diffraction point on a diffraction lattice of a scale and detects mixing waves of many light beams which are generated at the diffraction point as an electrical signal. Especially, it is concerned with an apparatus which prevents the return light from interfering with the light source.

2. Description of the Related Art

An example of a conventional high-resolution photoelectric-type encoder is a lattice interference-type displacement detection equipment which uses the technique of holography for a scale, which scale is formed of minute pitches (about 1 micrometer generally), makes use of the scale as a diffraction lattice and detects relative displacement with a high degree of accuracy. The conventional apparatus makes a beam of light from the light source branch into two light waves, makes them incident at one or two diffraction points on the diffraction lattice of the scale, and detects mixing waves of many light beams generated at the diffraction point as an electrical signal. The apparatus is classified into one which uses a reflection-type diffraction lattice and one which uses a penetration-type diffraction lattice.

The lattice interference-type displacement detection equipment which utilizes the reflection-type diffraction lattice is shown in FIG. 4. It is composed of the reflection-type scale 1A which is provided so that displacement to the direction of left-and-right in the figure is possible and has a reflection-type diffraction lattice 2A along the direction of the displacement, a laser light source 11, half-mirror 24 which makes the laser beam from the laser light source 11 branch into two divergence light beams A, B, a pair of mirrors 23A, 23B which reflect each of divergence light beams A, B and makes them incident at identical diffraction point P on the diffraction lattice 2A of scale 1A from a symmetrical direction respectively, mirror 32 reflects first diffraction light beams A1, B1 above the diffraction point P, and detector 41 converts the mixing wave from the light beam mixing means, which mixed the light beams reflected through scale 1A, mirrors 23A, 23B and half-mirror 24, to an electrical signal. Light beam divergence means 21 is composed of the above-mentioned half-mirror 24 and the pair of mirrors 23A, 23B. Light beam mixing means 31 is composed of the above-mentioned half-mirror 24, the pair of mirrors 23A, 23B and mirror 32 respectively.

Therefore, the laser beam from the laser light source 11 is divided into two divergence light beams by the half-mirror 24. After each of the divergence beams A, B are reflected at each of the mirrors 23A, 23B, they are made incident at identical diffraction point P on the diffraction lattice 2A of scale 1A from a symmetrical direction respectively. Then, first diffraction light beams A1, B1 of divergence beams A, B respectively, are generated on the diffraction point P. After each first diffraction light A1, B1 are reflected by mirror 32, scale 1A, and mirrors 23A, 23B in order, they are mixed by the half-mirror 24 and are led to the detector 41. After detector 41 makes the direction of polarization of the mixing wave which was mixed by the half-mirror 24 coincide with a polarization plate and makes it interfere, the light receiving element changes it to an electrical signal. Accordingly, total sine wave signals $\phi A$ of two cycles are attained from detector 41 when scale 1A displaces one pitch of diffraction lattice 2A.

The lattice interference-type displacement detection equipment which utilizes the penetration-type diffraction lattice is shown in FIG. 5. It is composed of a penetration-type scale 1B which is provided so that displacement to the direction of left-and-right in the figure is possible and has a penetration-type diffraction lattice 2B along the direction of the displacement, laser light source 11, polarization beam splitter 22 which makes the laser beam from laser light source 11 branch into two divergence light beams A, B along the direction of slant, a pair of mirrors 23A, 23B which reflect each of the divergence light beams A, B and makes them incident at identical diffraction point P on the diffraction lattice 2B of scale 1B from a symmetrical direction respectively, mirror 32 reflects first diffraction light beams A1, B1 which are generated at the diffraction point P, beam splitter 34 mixes the reflected light beams, and detector 41A, 41B converts the mixing waves to electrical signals. Here, light beam divergence means 21 is composed of the above-mentioned polarization beam splitter 22 and mirrors 23A, 23B. Light beam mixing means 31 is composed of the mirror 32 and the beam splitter 34.

Therefore, the laser beam from the laser light source 11 is divided into two divergence beams according to the direction of the slant of polarization beam splitter 22. After each of divergence beams A, B are reflected at each of the mirrors 23A, 23B, they are made incident at identical diffraction point P on the diffraction lattice 2B of scale 1B from a symmetrical direction respectively. Then, first diffraction light beams A1, B1 of divergence beams A, B respectively, are generated at the diffraction point P. Each first diffraction light beam A1, B1 is first reflected by the mirror 32 then mixed by the beam splitter 34 before being led to the detectors 41A, 41B. After the detector 41A makes the direction of polarization of a first mixing wave which was mixed by beam splitter 34 coincide with a polarization plate and makes it interfere, the light receiving element changes it to an electrical signal. The detector 41B retards the phase of a second mixing wave which was mixed with the beam splitter 34, by 90-degrees with respect to the first mixing wave which is made incident to the detector 41A with a ¼ wavelength plate. After making the direction of the polarization of the second mixing wave coincide with the polarization plate and making it interfere, the light receiving element changes it to an electrical signal. By this, total sine wave signals $\phi A$, $\phi B$ of two cycles which have a 90-degree phase difference are attained from detectors 41A, 41B when scale 1B displaces one pitch of the diffraction lattice 2B.

However, both of the above lattice interference-type displacement detection devices have an optical system which makes divergence beams A, B incident from the slant to scale 1A, 1B and makes the beams reflect and diffract in the direction of a right angle which problematically returns light to laser light source 11. To remove this, a polarization device and a wavelength plate and so on are necessary and moreover, because removing the return light is difficult even if these devices were so equipped, there is a problem in that output from a laser light source becomes unstable.

Also, because the beams A, B are incident from the slant to scale 1A, 1B and the first diffraction light A1, B1 reflects in the direction of a right angle, the arrangement of an optical device is thus limited. Especially, in the case of the penetration-type diffraction lattice 2B, because it is necessary to arrange mirror 32 opposite the optical components such as laser light source 11, light beam divergence means 21, light beam mixing means 31, and detectors 41A, 41B, with respect to the scale 1B, therefore there is a problem in that building the equipment is difficult.

An object of this invention is to resolve such conventional faults so as to prevent return light from interfering with the light source and to provide an optical arrangement which is different from the prior art and to provide lattice interference-type displacement detection equipment which is easy to build.

SUMMARY OF THE INVENTION

Therefore, the feature of the lattice interference-type displacement detection equipment in this invention is the following. The lattice interference-type displacement detection device of the present invention includes a scale which has a penetration-type diffraction lattice, a light source, a light beam divergence means which makes beams from this light source branch into two divergence light beams and makes each of the divergence beams incident to an identical diffraction point on the diffraction lattice of the above scale, a light beam mixing means mixes many light beams generated at the diffraction point on the above-mentioned diffraction lattice, and a detector which converts the mixing waves which are mixed by the light beam mixing means to electrical signals. The above light source, beam divergence means, beam mixing means and detector are arranged respectively on one side of the scale, which scale is formed with a light reflection surface, which surface reflects the light beams generated at the above-mentioned diffraction point.

The feature of the displacement detection method in this invention is the following. The displacement detection method of the present invention includes the steps of diverging the light beams from the light source into two divergence light beams, controlling each of the divergence beams incident to an identical diffraction point on the diffraction lattice of the scale, mixing a plurality of beams which were generated at the diffraction point and detecting a displacement value by changing the mixing wave to an electrical signal, the method having characteristic steps of generating first diffraction light beams whose phases are shifted in the opposite direction at the diffraction point with respect to each other, mixing the first diffraction light beams, changing the resulting mixing waves to electrical signals, and reflecting penetrate lights not diffracted to another direction different from that of the first diffraction light and the light source.

First, after the light beam from the light source is branched into two light waves with the divergence means, they are made incident at the identical point on the diffraction lattice of the penetration-type scale. Then, the first diffraction light beams whose phase is shifted in the opposite direction at the diffraction point with respect to each other are generated. If the optical system is arranged so that the optical paths of the first diffraction light beams which are generated at the diffraction point and the optical paths of penetration light beams are different, then the first diffraction light beams reflect on the light reflection surface of the scale at an angle capable of making an incidence in the detector after mixing by the light beam mixing means, and the penetration light beams reflect at an angle which is different from the first diffraction light beams and is therefore incapable of making an incidence in the light source respectively, thus it is possible to prevent return light from interfering with the light source.

Also, the first diffraction light beams which are generated at the identical point on the diffraction lattice are reflected in the direction of incidence of each divergence beam on the light reflection surface of the scale after their phases are shifted in the opposite direction from each other. In other words, incident beams and reflected beams become the same direction. Therefore, it is possible to provide an optical arrangement which is different from a conventional reflection-type lattice interference-type displacement detection equipment. Moreover, as for the composition, all the optical components such as the light source, a beam divergence means, a beam mixing means and the detector are arranged on one side of the scale, thus building the equipment is easy.

DETAILED DESCRIPTION

Figure 4:
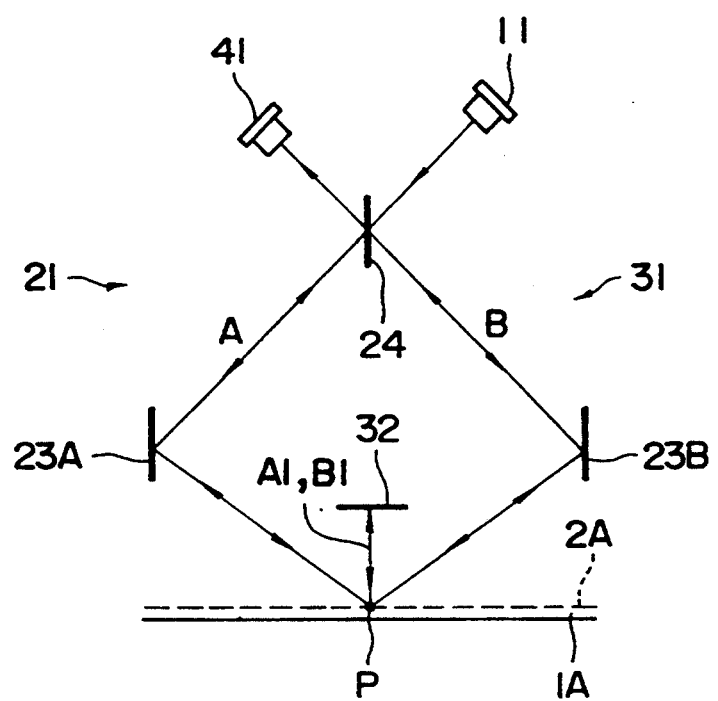
FIG. 4 shows the conventional lattice interference-type displacement detection equipment (which used a reflection type diffraction lattice).
Figure 5:
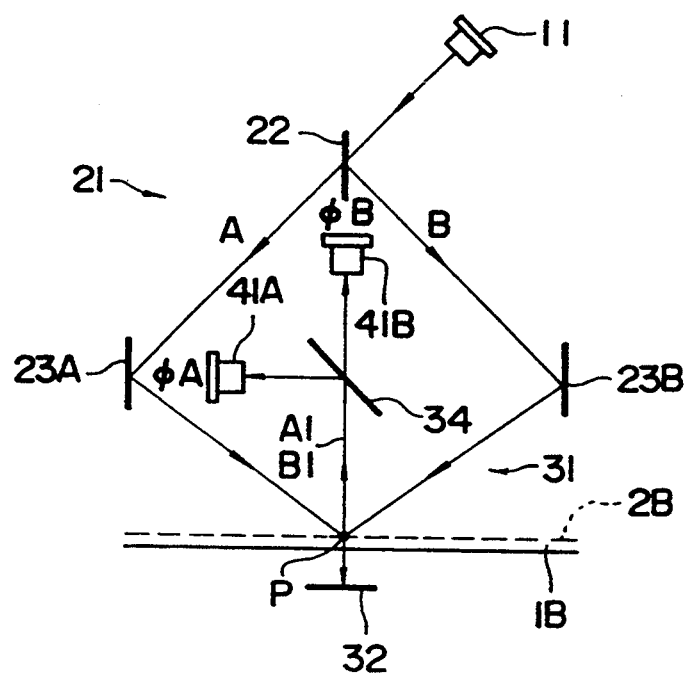
FIG. 5 shows the conventional lattice interference-type displacement detection equipment (which used a penetration-type diffraction lattice).

Hereinafter, one of preferable embodiments about lattice interference-type displacement detection equipment in this invention is given and explained in detail referring to the attached drawings. Incidentally, in the following explanation, as for the above-mentioned FIGS. 4 and 5, and identical composition important matter, the identical reference numerals are used and the explanation is omitted or simplified.

Figure 1:
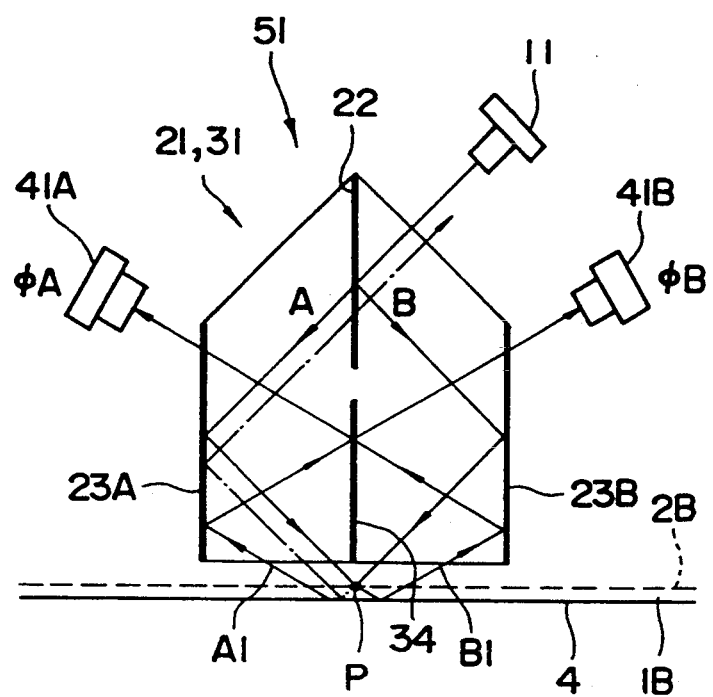
FIG. 1 shows the one embodiment of lattice interference-type displacement detection equipment of the present invention.

The lattice interference-type displacement detection equipment of this embodiment is shown in FIG. 1. In this lattice interference-type displacement detection equipment, a light source 11, light beam divergence means 21, light beam mixing means 31, and detectors 41A, 41B are arranged respectively on one side of a penetration-type scale 1B, i.e. on one side of a diffraction lattice 2B, and light reflection surface 4, which surface 4 reflects first diffraction light beams A1, B1 which are generated at a diffraction point P.

Here, the above-mentioned beam divergence means 21 and beam mixing means 31 are composed of prism 51 in a body. In the center position of the inside of prism 51, polarization beam splitter 22, which composes beam divergence means 21, makes a laser beam from the above-mentioned laser light source 11 branch into two divergence light beams A, B along the direction of the slant, and beam splitter 34, which composes the above-mentioned beam mixing means 31, are provided respectively. Also, in both sides, mirrors 23A, 23B make divergence beams A, B branch from the above-mentioned polarization beam splitter 22 incident at identical diffraction point P on the diffraction lattice 2B of the above scale 1B and reflects the light beams which are generated at the diffraction point P and are reflected on light reflection surface 4 to the above-mentioned beam splitter 34.

Figure 2A:
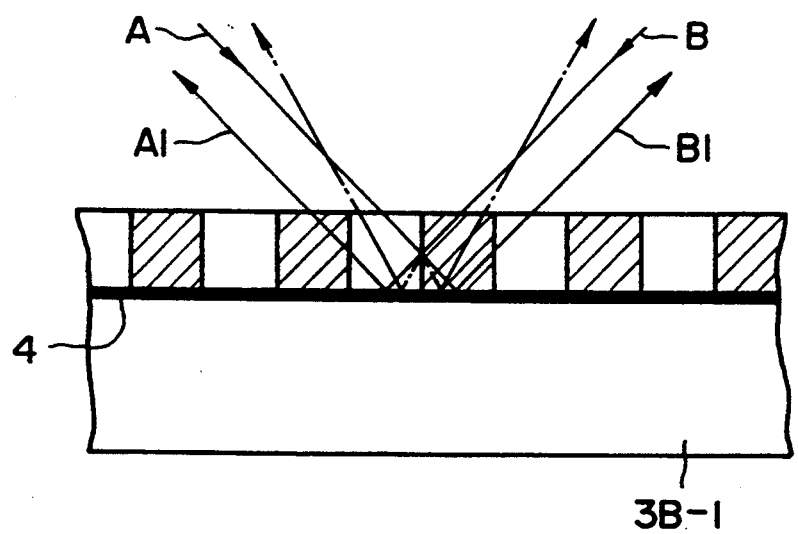
FIGS. 2A and 2B show alternative compositions of the scale 1B in FIG. 1.
Figure 2B:
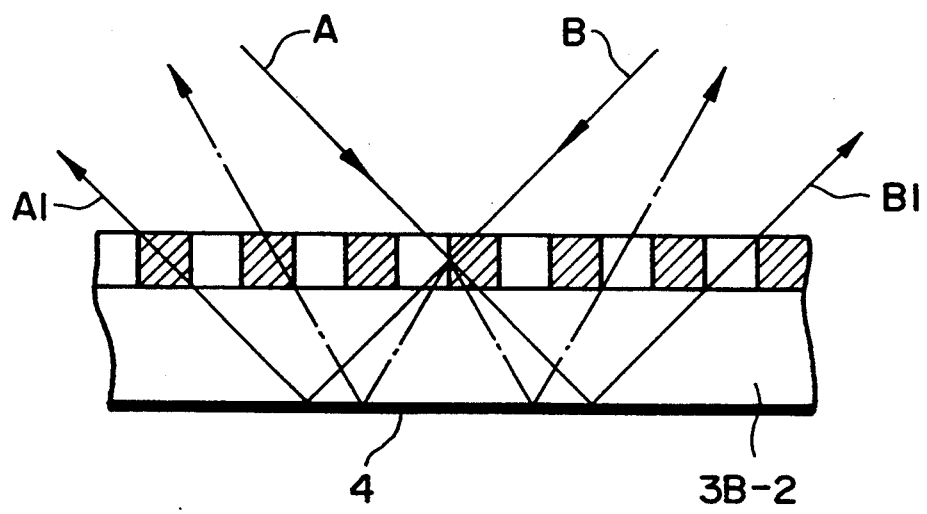

The above light reflection surface 4 is formed between penetration-type diffraction lattice 2B and scale board 3B-1 as shown in FIG. 2(A). In this case, it is possible to use metal in addition to the material which has translucency such as the glass and so on for the material of scale board 3B-1. The above light reflection surface 4 can also be formed on the surface opposite to the penetration-type scale 2B of scale board 3B-2 as shown in FIG. 2(B). In this case, it is necessary that the material of scale board 3B-2 is the material which has translucency such as glass.

The laser beam from laser light source 11 is branched into two divergence light beams A, B with polarization beam splitter 22. Each of divergence beams A, B are made incident at identical diffraction point P on the diffraction lattice 2B of scale 1B after being reflected by mirrors 23A, 23B respectively. Then, first diffraction light beams A1, B1 are generated at the diffraction point P. first diffraction light beams A1, B1 are reflected on light reflection surface 4 and next, after being reflected by mirrors 23A, 23B respectively, are mixed by beam splitter 34.

In other words, the reflected light of the one first diffraction light beam A1 and the penetration light beam of the other first diffraction light beam B1 are mixed, and the penetration light beam of the one first diffraction light beam A1 and the reflected light beam of the other first diffraction light beam B1 are mixed. After that, a first mixing wave is led to detector 41A, there, it is changed to an electrical signal and is taken out as sine wave signal $\phi A$. A second mixing wave is led to the other detector 41B and 90-degree phase shifted, it is then changed to an electrical signal and is taken out as sine wave signal $\phi B$.

Therefore, this embodiment makes the laser beam incident at identical diffraction point P on diffraction lattice 2B of scale 1B after making it branch into two divergence light beams A, B. Then, first diffraction light beams A1, B1 whose phase was shifted to the opposite direction at the diffraction point P with respect to each other is generated. At this time, by arranging so that the optical path of first diffraction light beams A1, B1 which are generated at diffraction point P and the optical path of penetration light beams is different, first diffraction light beams A1, B1 are mixed by beam mixing means 31 after being reflected on light reflection surface 4 of scale 1B and next, are made incident to detectors 41A, 41B. On the other hand, as for the penetration light beams, after being reflected at an angle which is different from first diffraction light A1, B1 on light reflection surface 4 of scale 1B, the penetration light is reflected in a different direction from laser light source 11 by mirrors 23A, 23B, whereby return light to the light source can be removed.

Also, first diffraction light beams A1, B1 which are generated at diffraction point P on diffraction lattice 2B are reflected in the direction of the incidence of each divergence beam A, B on light reflection surface 4 of scale 1B after their phase is shifted to the opposite direction from each other. In other words, the incident light beams and the reflected light beams become the same direction. Therefore, it is possible to provide an optical arrangement which is different from a conventional reflection-type lattice interference-type displacement detection equipment and to expand the extent of freedom of the designing. Moreover, all optical components such as light source 11, beam divergence means 21, beam mixing means 31, and detectors 41A, 41B are arranged on one side of scale 1B, and building the equipment is easy.

Also, as the optical device which composes beam divergence means 21 and beam mixing means 31, i.e. polarization beam splitter 22, beam splitter 34, and mirrors 23A, 23B are composed of prism 51 in a body, it is possible to compose a main detection system by one prism. This leads to the reduction of the number of parts and can contribute to the reduction of the number of the erectors, too.

Above, explanation has been done giving preferable embodiment about this invention but this invention is not limited to this embodiment. Of course, various improvements and the alteration of designing are possible in the area which do not deviate from the objective of this invention.

Figure 3:
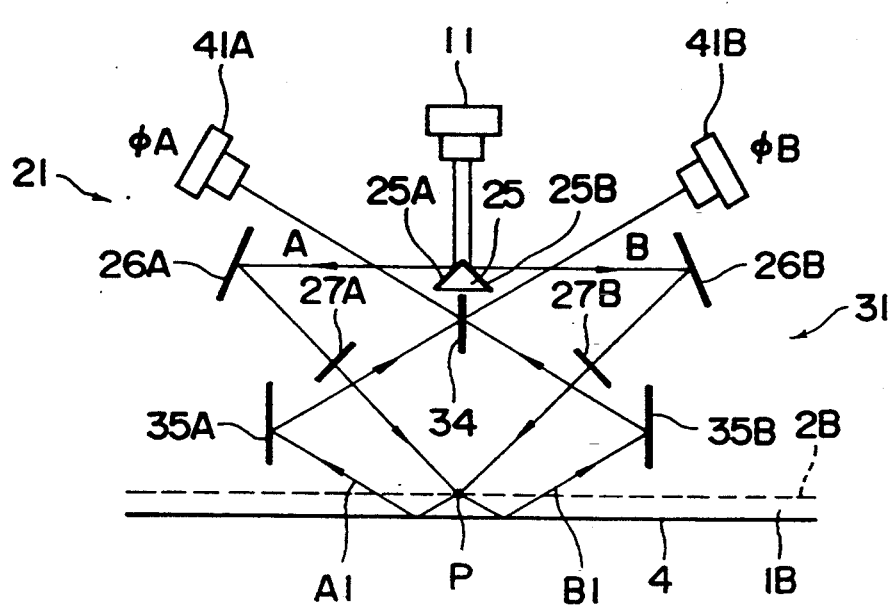
FIG. 3 shows another embodiment of lattice interference-type displacement detection equipment in this invention.

For example, in the above embodiment, the above-mentioned beam divergence means 21 and beam mixing means 31 were composed of prism 51 in a body but as shown in FIG. 3, these may be composed as separate body. In this case, the beam divergence means 21 is composed of mirror 25 which has right angle reflection surfaces 25A, 25B which makes the laser beam branch into two light beams A, B into the level direction, a pair of mirrors 26A, 26B which makes each of beams A, B incident at identical diffraction point P on penetration-type diffraction lattice 2B of scale 1B, and polarization plate 27A, 27B which are inserted onto the optical path of the reflected light of each mirror 26A, 26B. Also, beam mixing means 31 is composed of a pair of mirrors 35A, 35B which reflects first diffraction light A1, B1 which are generated at the above-mentioned diffraction point P and are reflected on light reflection surface 4, and beam splitter 34 which mixes the light beams reflected at each mirror 35A, 35B.

If doing to such composition, in addition to the effect which was stated by the above embodiment, making the laser beam itself from laser light source 11 branch into two light waves A, B with right angle reflection surfaces 25A, 25B of mirror 25, a different optical arrangement can result without the use of the optical device of half-penetration (for example the half-mirror and beam splitter). Moreover, by choosing the angle of the reflection surfaces 25A, 25B, there is an advantage that it is possible to freely choose the division angle which branches the light waves. With this, it is possible to reduce the size of a detection system compared with conventional one.

Also, in the above embodiment, scale 1B was provided so that it is able to do the displacement for the optical components such as laser light source 11, beam divergence means 21, beam mixing means 31, and detectors 41A, 41B.

As above, in the lattice interference-type displacement detection equipment of this invention, all optical components are arranged on one side of the scale and the light reflection surface reflects the light beams generated at the diffraction point. Therefore it can prevent return light from interfering with the light source and make incident light beams and reflected light beams in the same direction. Hence, the optical arrangement which is different from a conventional reflection-type lattice interference-type displacement detection equipment becomes possible. Moreover, because all optical components such as the light source, a beam divergence means, a beam mixing means and the detector are arranged on one side of the scale in the composition, building in the equipment is easy.

What is claimed is:

1. A lattice interference-type displacement detection device comprising:
   (a) a scale having a scale board and a penetration-type diffraction lattice formed on one side of said scale board;
   (b) an optical system positioned at the side of said diffraction lattice,
      (i) said optical system including a light source means for emitting a light beam along a light source optical path,
      light beam branch means for branching said light beam into first and second branch light beams along first and second optical paths respectively and for causing said first and second branch light beams to be incident at a diffraction point on said diffraction lattice,
      light beam mixing means for generating first and second mixing light beams from a first plurality of diffraction light beams generated at said diffraction point, and means for converting said first and second mixing light beams into respective electrical signals;
   (c) said scale also having a light reflection surface on either side of said scale board, said diffraction lattice disposed closer than said light reflection surface to said optical system, said light reflection surface reflects said first plurality of diffraction light beams generated at said diffraction point to said light beam mixing means along third and fourth optical paths respectively;
   (d) said optical system being arranged so that a second plurality of diffraction light beams generated at said diffraction point are not reflected back along said light source optical path to said light source means; and
   (e) said light beam branch means and light beam mixing means being constructed of a single prism.

2. The device according to claim 1, wherein said light beam branch means includes a first mirror which has right angle reflection surfaces which causes said light beam to branch into said first and second branch light beams, a pair of second mirrors which reflect said first and second branch light beams to said diffraction point along said first and second optical paths respectively, and a pair of polarization plates disposed along the first and second optical paths respectively between said second mirrors and said diffraction point, and wherein said light beam mixing means includes a pair of third mirrors which reflect said first plurality of diffraction light beams to a beam splitter from said light reflection surface.

3. The device according to claim 1, wherein said light beam branch means includes a polarization beam splitter and said light beam mixing means includes a beam splitter.

4. The device according to claim 3, wherein said light beam branch means further includes a pair of first mirrors which cause said first and second branch light beams to be incident at said diffraction point, and said light beam mixing means further includes a pair of second mirrors which reflect said first plurality of diffraction light beams travelling along said third and fourth optical paths respectively to said beam splitter.

5. The device according to claim 1, wherein said scale board is made of metallic material, and said light reflection surface is disposed between said scale board and said diffraction lattice.

6. The device according to claim 1, wherein said scale board is made of a translucent material, and said light reflection surface is disposed on the side of said scale board opposite the side where said diffraction lattice of said scale board is provided.

7. A displacement detection method comprising the steps of:
   directing a light beam from a light source into a single prism;
   branching said light beam into first and second diverging light beams within said prism;
   reflecting said first and second diverging light beams within said prism to a diffraction point on a diffraction lattice of a scale;
   generating first and second diffracted light beams from said first and second divergence light beams at the diffraction point, said first and second diffracted light beams having phases which are shifted opposite with respect to said first and second divergence light beams respectively;
   mixing said diffracted light beams together within said prism to form first and second mixing light beams;
   detecting a displacement value of the scale by converting the first and second mixing light beams to first and second electrical signals respectively; and
   preventing a plurality of third diffraction light beams generated at said diffraction point from being reflected back to said light source by reflecting said third diffraction light beams along optical paths different from optical paths of said first and second diffraction light beams.

* * * * *